United States Patent [19]
Yamada

[11] Patent Number: 4,957,285
[45] Date of Patent: Sep. 18, 1990

[54] DOCUMENT FEEDER WITH SHEET EDGE REGULATING MECHANISM

[75] Inventor: Yasushi Yamada, Tokyo, Japan

[73] Assignee: Konica Corporation, Tokyo, Japan

[21] Appl. No.: 333,399

[22] Filed: Apr. 5, 1989

[30] Foreign Application Priority Data

Apr. 7, 1988 [JP] Japan .................................. 63-87592
Apr. 15, 1988 [JP] Japan ............................. 63-51030[U]

[51] Int. Cl.⁵ .............................................. B65H 5/00
[52] U.S. Cl. .................................... 271/3.1; 271/126; 271/147; 271/245
[58] Field of Search ................ 271/3.1, 110, 126, 245, 271/246, 291, 145, 147

[56] References Cited

U.S. PATENT DOCUMENTS

| | | | |
|---|---|---|---|
| 4,135,804 | 1/1979 | Schoppe et al. | 271/245 |
| 4,761,001 | 8/1988 | Hayakawa et al. | 271/3.1 |
| 4,786,039 | 11/1988 | Ito | 271/3.1 |

*Primary Examiner*—H. Grant Skaggs
*Attorney, Agent, or Firm*—Finnegan, Henderson, Farabow, Garrett and Dunner

[57] ABSTRACT

A document feeder for use in a copy machine includes a gate plate disposed between a document sheet stacker and a sheet separator for separating a sheet from the bottom of a stack of document sheets. The gate plate is adapted to be lifted to regulate the passage of the stack of document sheets so that when the gate plate is lowered, the leading edges of the document sheets in the stack come in contact with the gate plate, whereby the leading edges of the documents are aligned, and while the gate plate is lifted upwardly, the stack of document sheets passes under the gate plate. The document feeder further includes a sheet edge-regulator attached to the gate plate so that when the gate plate is lifted upwardly, the sheet edge-regulator is moved adjacent the upper surface of the stack of document sheets and regulates the leading edge of the stack of document sheets so as to pass under the gate plate.

5 Claims, 14 Drawing Sheets

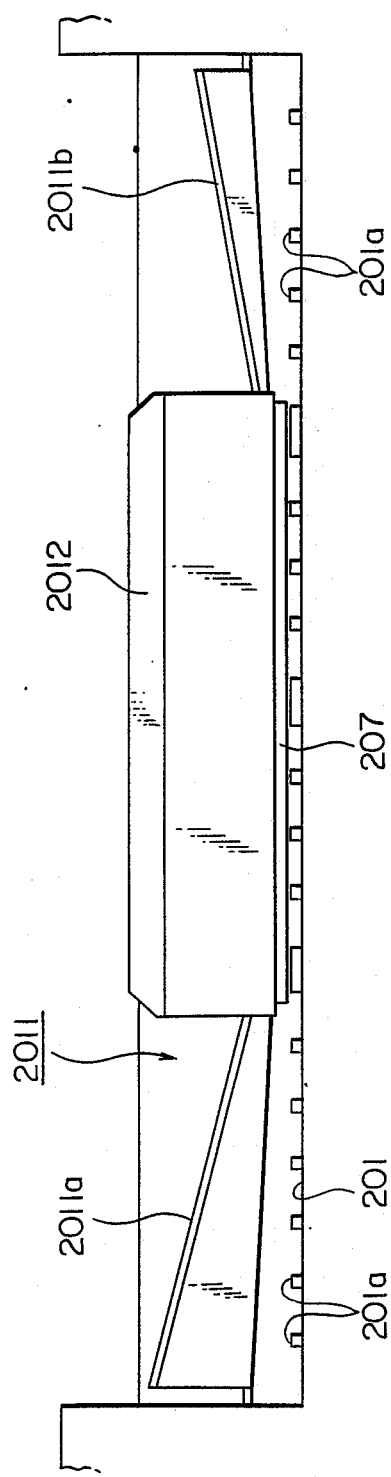

DOCUMENT FEEDER WITH SHEET EDGE REGULATING MECHANISM

BACKGROUND OF THE INVENTION

1. Field of the Invention

The invention relates to a circulation type document feeder which is used for a copy machine equipped with a document stacker on which document sheets are stacked, carried from the stacker sheet by sheet to be exposed on a platen glass, and returned to the document stacker after exposure.

2. Description of the Prior Art

A circulation type document feeder generally makes one copy at one circulation of a document, so the document must be circulated the same number of times as copies needed. In this type of device, document sheet separation efficiency of a document feed device is very important. The conventional bottom feed-upper return method is known to be excellent in document sheet separation efficiency. By this method, document sheets are stacked on a stacker and the bottom document sheet of the stack is separated from the stack and conveyed to the following unit sheet by sheet. After being exposed, the document sheet is returned to the top of the document stack. This operation is repeated.

The bottom sheet is fed by two methods. One is separating a document sheet by absorption using air suction and the other is separating by friction using a document sheet feed belt and a roller which comes into contact with the belt. The latter compares favorably with the former in that the cost is low, the size is compact and its maintenance and adjustments are easy. A typical example of this type of document feeder is shown in FIG. 12.

As shown in FIG. 12, the document feeder 20 is sharply inclined forwards so that the leading edge of the document sheet to be fed is set downward. As a result, the document stacker 21 is inclined and the document feed opening 22 is set at the lowest part of the stacker 21. A document sheet 'D' which is delivered from the first document feed section 23 close to the document feed opening 22 of the stacker 21 is guided from the second document feed section 24 to the platen glass 11 of the copy machine 10 through the document sheet path 25. The document 'D', is moved by the carrier belt 26 onto the platen glass 11 in the right place for exposure and the optical exposure system 12 is operated. After that, the document sheet is moved backward by the carrier belt 26 and returned onto the document stacker 21 from the outlet 28 installed above the document feed opening 22 through return path 28. In this way, the document sheet which has been processed is returned to the top of the unprocessed document sheets on the stacker 21. In this case, processed documents and unprocessed documents are divided by a partition board 29 which is installed close to the document feed opening 22. This partition board 29 is turned counterclockwise after the last unprocessed document is processed and stacked again. As a result, the partition board 29 is on the top of the stack.

The conventional document feed method is explained above. The problems of the conventional method are as follows.

In the conventional method, the document sheet stacker must be set at a steep angle. In other words, it is necessary that the inclination of the stacker 21 is such that the height of the machine is very great. The second stacking is conducted by gravity using the weight of a sheet of paper itself. As a result, the leading edges of document sheets are not arranged well. Furthermore, a document sheet is stopped sometimes because of folds or curls in the paper. Document paper separation efficiency may deteriorate a great deal because of those problems mentioned above. Inclination of the document sheet stacker 21 is high, so there is the possibility that the second stacking document paper may go under the partition board 29. Furthermore, the document must be returned to the document stack after being exposed at the correct position on the platen glass, so a great deal of time is needed to exchange document sheets. Generally speaking, document sheets which have been processed and stacked again are slightly curled on both sides. This type of document sheet causes many problems when it is fed to the document sheet feed opening. Sometimes it causes no feed, double feed or folding of the document sheet.

SUMMARY OF THE INVENTION

The present invention solves those problems mentioned above. The objective of the invention is to feed document sheets without inclining the document stacker steeply, to return the document sheet within a closed loop to the document stacker after being processed, and to feed document sheets stably and correctly. Another objective of this invention is to provide high separation efficiency of both unprocessed document sheets and processed document sheets. Furthermore, an object of the present invention is to prevent folds in document sheets when they are stacked on the document stacker and to prevent damage, stain, distortion of images and so forth.

In order to attain these objectives, in a document feeder wherein document sheets are piled on a document stacker, the pile or stack of documents on the stacker is moved to the paper feeding direction, the bottom sheet of the pile is separated from the pile by a separation method, the sheet is fed to be processed through a document sheet path, and the sheet is returned to the document sheet stacker. Document sheet leading edge curl control members are installed on both sides of a gate which is movable both upwards and downwards to stop, and then to feed document sheets, and the control members are linked to a gate and oscillated with the movement of the gate. To attain these objectives, one further method has been adopted in the present invention. A curved document sheet guide is installed at a position close to the above-mentioned separation means. By the use of this guide, leading edges of document sheets are guided to the document sheet separation means correctly.

BRIEF DESCRIPTION OF THE DRAWINGS

FIG. 10 is a front view of a document guide of the present invention.

DETAILED DESCRIPTION OF THE INVENTION

An embodiment of the present invention is explained below using the attached drawings.

Figure 1:
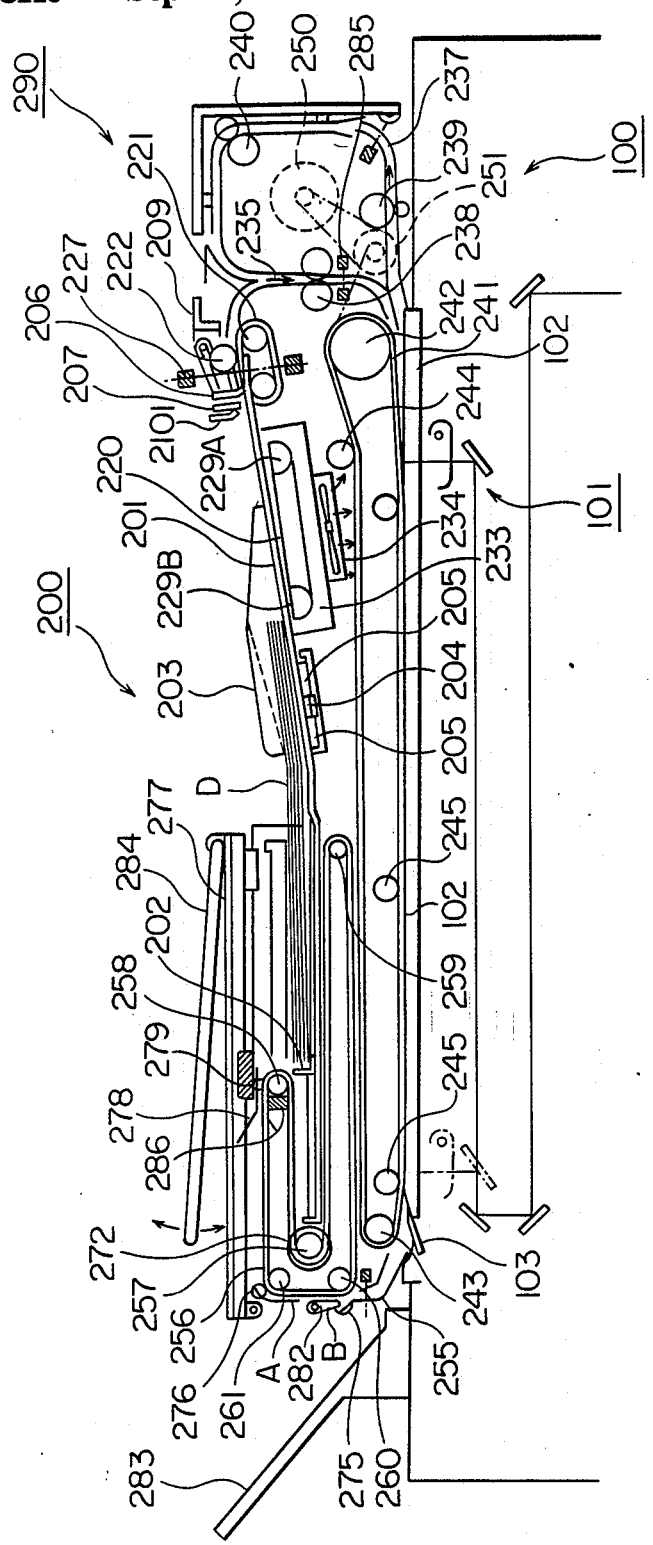
FIG. 1 is a front sectional view of a document feeder.

FIG. 1 is a schematic drawing of the invention. In FIG. 1, the numeral 100 represents a copy machine, and the numeral 200 represents a document feeder. The document feeder 200 is equipped with a document stacker 201, the front part of which is slanted upwardly. A document trailing edge arrangement board 202 against which trailing edges of document sheets are checked when document sheets 'D' are set on the document sheet stacker 201, and document sheet side arrangement boards 203 are installed in the copy machine. The document sheet side arrangement boards 203 are connected with slidable racks 205 which can symmetrically move with regard to the center line of the machine being driven by a pinion gear 204. The position of the document sheet side arrangement board is detected by a sensor which is not shown in the drawing and the width of the document sheet can be detected by the sensor. The function of the above-mentioned document sheet trailing edge arrangement board 202 is that it pushes out the document sheets 'D' which are set on the document sheet stacker 201 until the leading edges of document sheets 'D' reach the fixed detecting position of the stack sensor 227.

The numerals 206 and 207 are a set of gate members which are raised when document sheets 'D' are moved toward the gate by the document sheet leading edge arrangement board 202. The members 206 and 207 descend onto the document sheets 'D' by gravity according to a signal from the stack sensor 227 when the leading edges of the document sheets reach the detecting point of the stack sensor 227.

The inner gate member 206 compresses the document sheets 'D', to be fed with its own weight whilst the outer gate member 207 arranges the leading edges of the document sheets 'D', which have been processed and returned to the document sheet stacker 201 by checking the leading edges against the member in preparation for the next sheet feeding.

Figure 2:
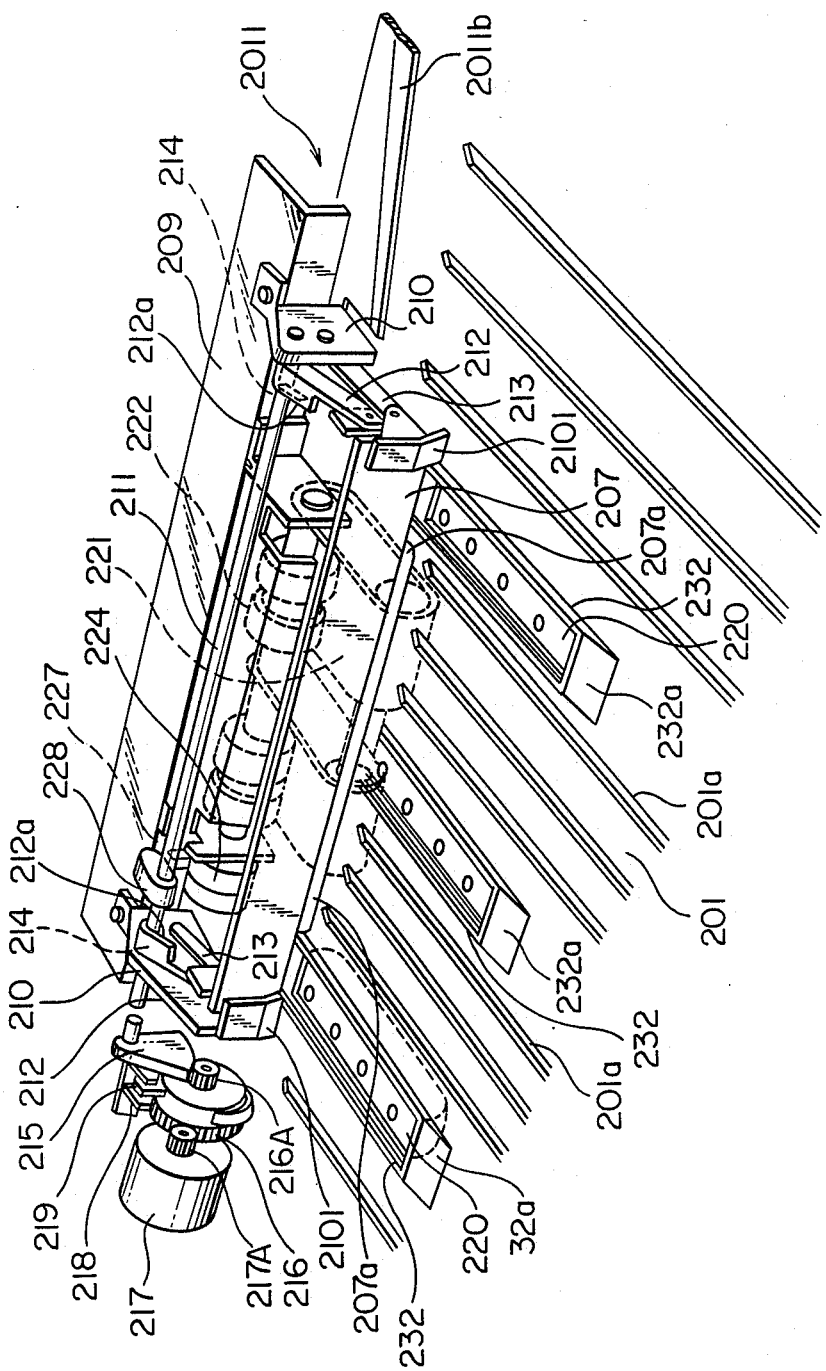
FIG. 2 is a perspective illustration which shows a document stacker and a document feed device.

FIG. 2 is a perspective illustration which shows the document sheet stacker and sheet feed mechanism.

Figure 3A:
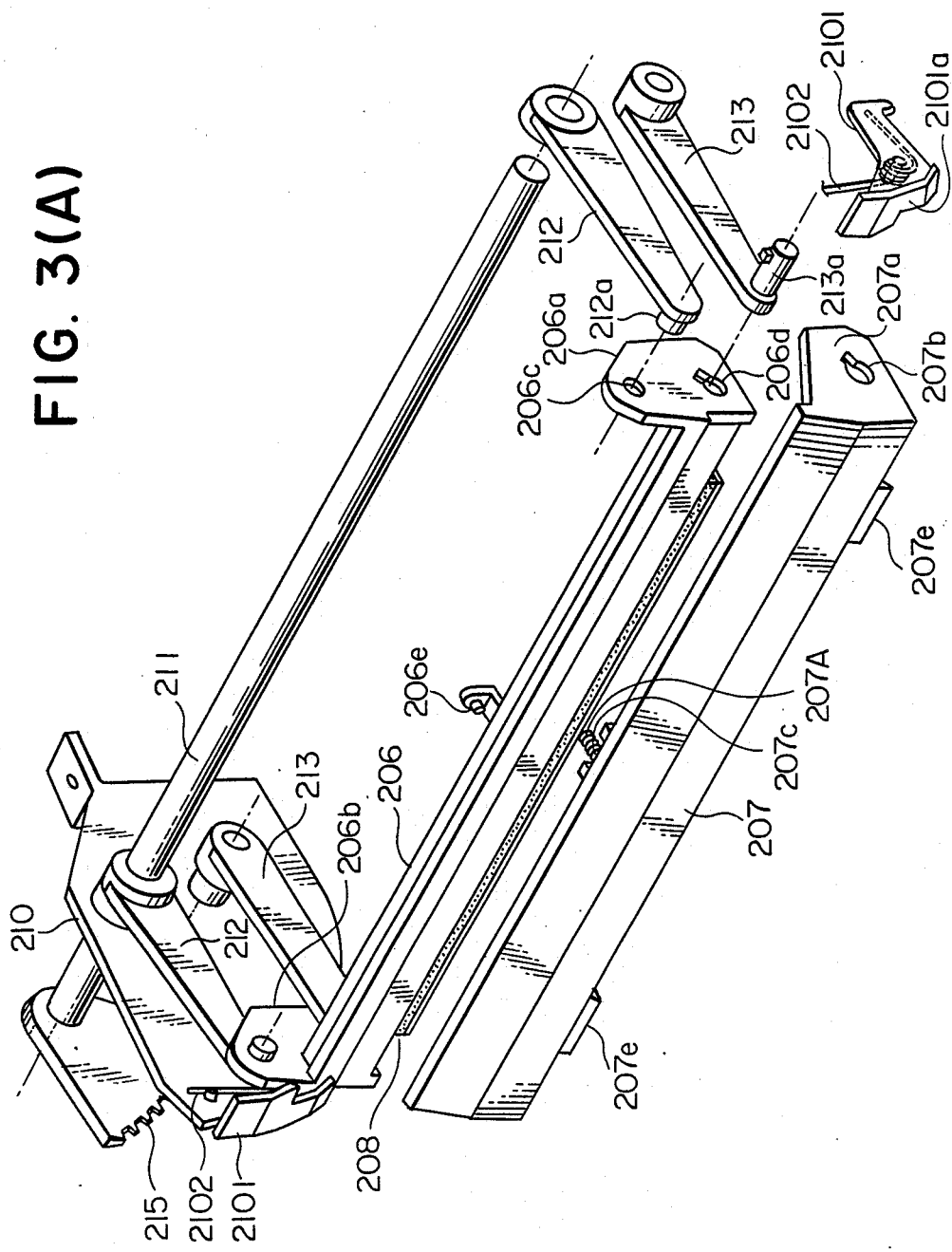
FIG. 3(A) is an exploded perspective illustration of gate members and the connection members.

FIG. 3(A) is an exploded perspective illustration which shows the inner gate member 206, the outer gate member 207, and levers 212 to raise and to lower these parts. The above-mentioned inner gate member 206 is U-shaped and its side members have holes 206c on its upper part and key-hole shaped holes 206d on its lower part.

The right side and left side gate levers 212 are installed at the shaft 211 Which is rotatively mounted on the upper side of the brackets 210 that are set on the front of the frame 209 of the document feeder 200 with bolts and the like. The bosses 212a of the tips of the gate levers 212 are fitted to the above-mentioned holes 206c to allow the inner gate member 206 to oscillate freely. The bosses 213a, which are the tips of the auxiliary levers 213 are fitted to the lower parts of the bracket 210 and allow the inner gate member to oscillate freely.

In this way, the inner gate member 206 is supported by the two rightside levers and two leftside levers. One set of them is the gate lever 212 and the other is the auxiliary lever 213. The inner gate member ascends and descends almost vertically to the document sheet surface.

A compression member 208 is attached to the lower side of the inner gate member 206. The compression member 208 consists of a resilient foam middle part, a pressure sensitive double sided adhesive tape which is stuck to both upper and lower sides, and a smooth flexible thin film member on the lowest side.

The bosses 213a of the auxiliary levers 213 penetrate the through holes 206d of the inner gate member 206 and penetrate through holes 207b installed in the both sides 207a of the outer gate member 207 to support the outer gate member 207 allowing it to oscillate freely.

Figure 3B:
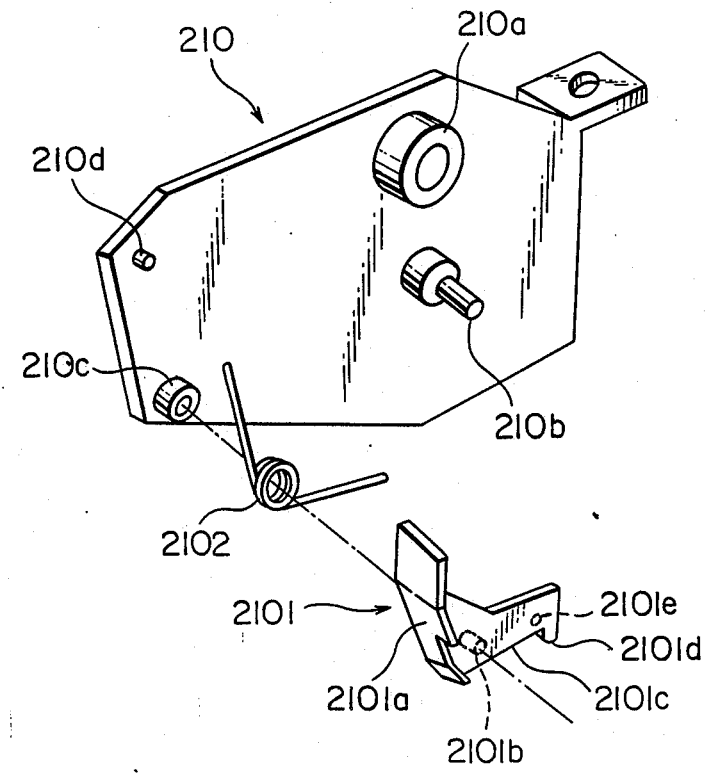
FIG. 3(B) is an exploded perspective illustration of a curl control member to control curls in document sheets and members to support it.

FIG. 3(B) is an exploded perspective illustration of one of the brackets 210. As the drawing shows, all four bosses 210a, 210b, 210c and 210d protrude inside. The above-mentioned shaft is rotatively fitted in the through hole of the boss 210a. The through hole of the auxiliary lever 213 is fitted to the protruding shaft of the boss 210a. The document sheet curl control member 2101 is rotatively fitted to the through hole of the boss 210c and the spring 2102 is fitted at the outer circumferential surface of the boss 210c. The boss 210d comprises a spring peg to hold one end of the spring 2102.

The outer surface 2101a of the document sheet curl control member 2101 is curved and smooth, in order to guide document sheets. The shaft 2101b protrudes from the inside of the document curl control member 2101 and fits rotatively into the through hole of the boss 210c of the bracket 210. The outer surface of the boss 213a of the auxiliary lever 213 comes into slidable contact with the sliding surface 2101c of the lower part of the document sheet curl control member 2101. The numeral 2101d represents a projection to prevent the boss 213a from disengaging and the numeral 2101e is a spring peg to hold one end of the above-mentioned spring 2102.

Figure 4A:
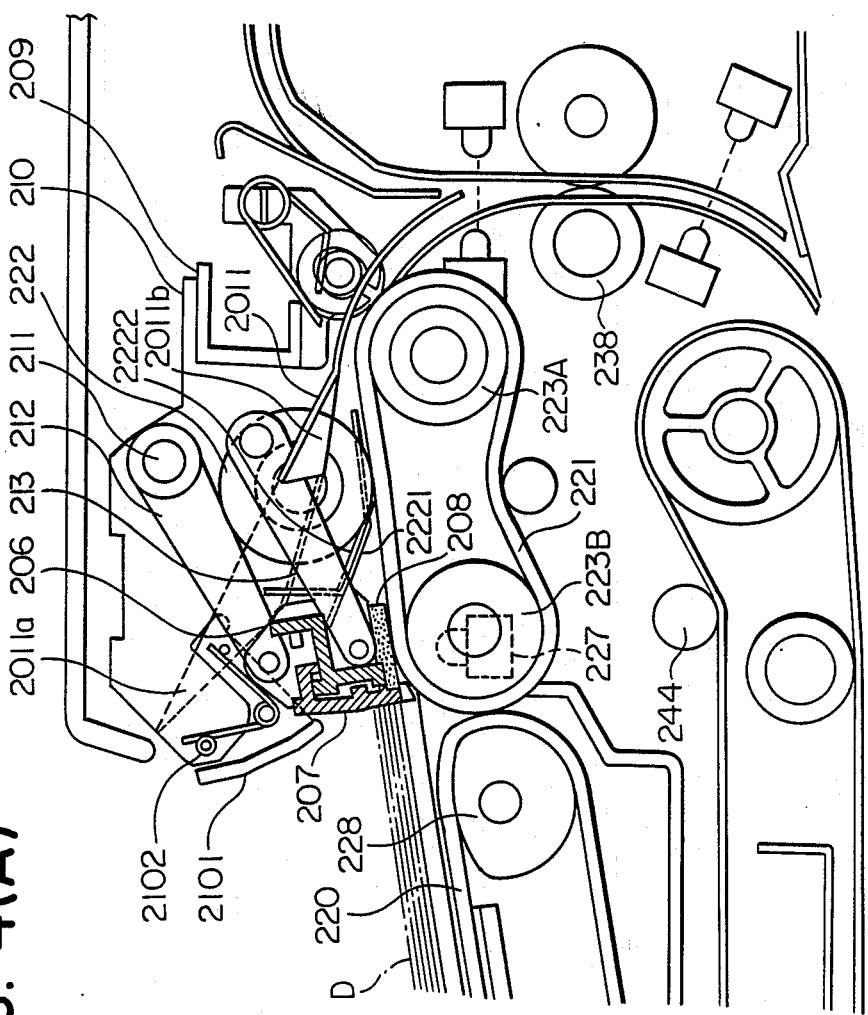
FIG. 4(A), FIG. 4(B), FIG. 5(A), and FIG. 5(B) are illustrations which show the operation of gate members and document curl control members.

FIG. 4(A) is an expanded sectional view which shows the gate lever 212, the auxiliary lever 213 in a lowered position and document sheets 'D' to be circulated for copying stacked on the stacker. In this state, the inner gate 206 and the outer gate 207 descend and document sheets 'D' stop when they come into contact with the outer surface of the outer gate 207. Document sheets are piled up in this way. At this moment, the document sheet curl control member 2101 stands up by virtue of tension of the spring 2102.

Figure 4B:
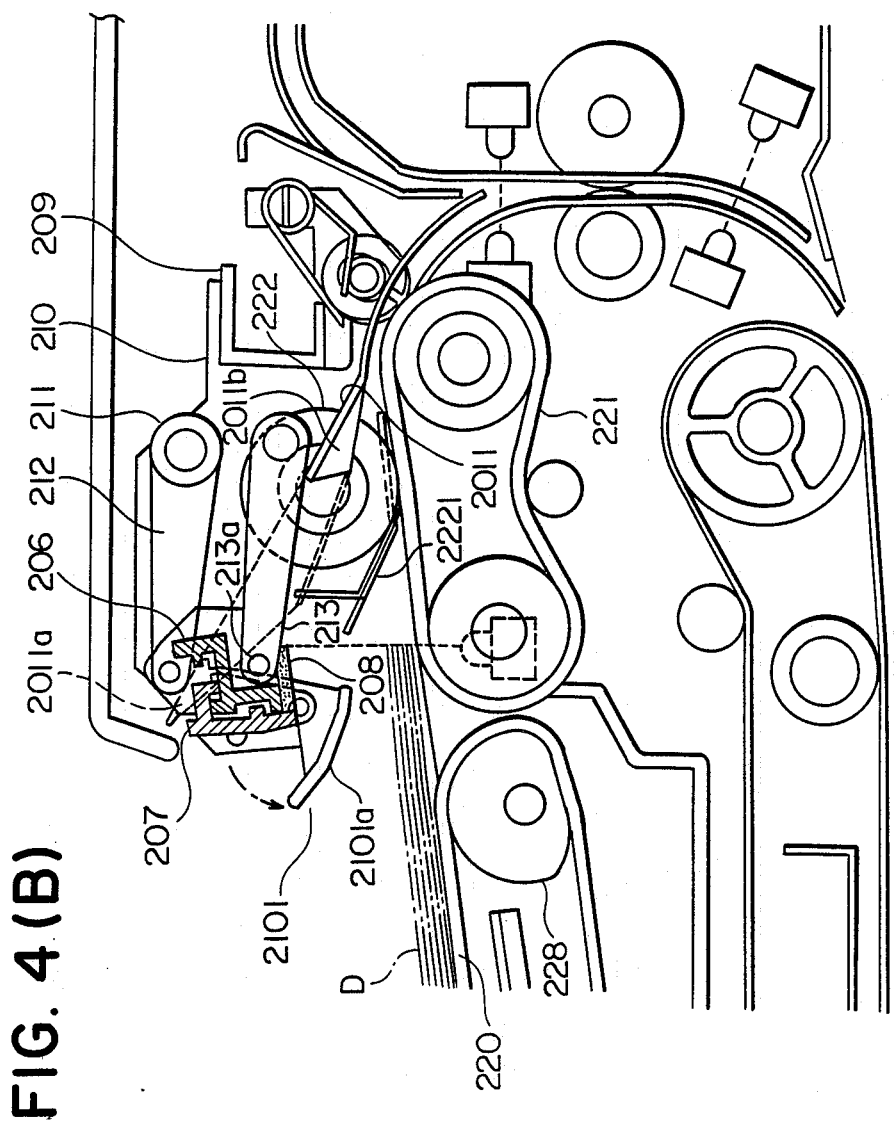

FIG. 4(B) is an expanded sectional view which shows the document sheet feed. When the gate lever 212 is turned clockwise by torque of the shaft 211, the inner gate member 206 and the outer gate member 207 ascend. Consequently the auxiliary lever 213, which is fitted to the through hole 206d of the inner gate member 206 and the boss 210b of the bracket 210 and can oscillate freely, is turned clockwise, too. Therefore, the boss 213a of the auxiliary lever 213 slides along the sliding part 2101c of the document sheet curl control member 2101 with pressure and is turned counterclockwise centering around the shaft 2101b of the document sheet curl control member 2101 resisting spring tension. As a result, the outer surface 2101a of the document sheet curl control member 2101 is set downward and the entrance for document sheets 'D' is open.

In this state, the push belt 202 and the document sheet feed belt 221 are driven. Therefore a pile of document sheets 'D' is carried. At this moment, even if both sides of a document sheet's leading edge are warped, its leading edge is controlled by the outer surface 2101a of the document sheet control member 2101 and the document sheets are fed smoothly and reach the document sheet separation point where the document sheet feed belt 221 comes into contact with the stop roller 222 with pressure.

A small helical spring 207A is compressed between the projection 207c which protrudes from the upper rear middle part of the outer gate member 207 and the projection 206e which protrudes from the upper middle part of the inner gate member 206. In this way, the upper part of the outer guide member 207 is pushed by the spring.

As shown in FIG. 4(A) and FIG. 4(B), this spring force is restrained by the contact of the projection 206f of the inner guide member 206 and the projection 207d of the outer guide member 207.

As shown in FIG. 2, ribs 201a are installed on the upper surface of the document sheet stacker 201 at an adequate interval. These ribs protrude a little from the surface of the stacker. As shown in FIG. 3(A), plural projection pieces 207e are installed in the lower part of the gate member 207 corresponding to the above-mentioned ribs 201a. These ribs are comb-shaped in relation to ribs 201a on the surface of the stacker. The function of these projection pieces and ribs is explained as follows. The document sheet 'D' on the stacker 201 is deformed by the ribs 201a and comblike projection pieces 207e. As a result, document sheets 'D' being fed can have a stiffness effective to prevent a document sheet from going under the gate.

Figure 5A:
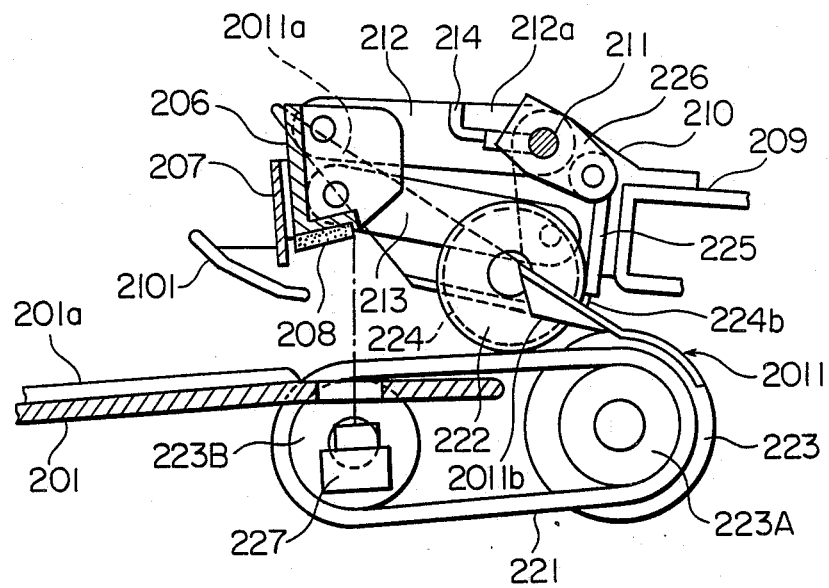

Gate levers 212 are equipped with bosses 212a in the inside upper parts and those lower parts come into contact with the push pins 214 which are mounted on the shaft 211. This shaft 211 is equipped with the sector gear 215 at its end. This sector gear 215 is engaged with the pinion gear 216A which is mounted on the same shaft with the gate cam gear 216. The gate cam gear 216 is engaged with the output gear 217A which is driven by the the drive unit 217 that can produce normal and reverse rotation. Therefore, when the shaft 211 is turned clockwise being driven by the drive unit 217, the push pins 214 push up the gate levers 212 with their bosses 212a and lift up the gate member 207 as shown in FIG. 4(A) and FIG. 5(A).

Figure 5B:
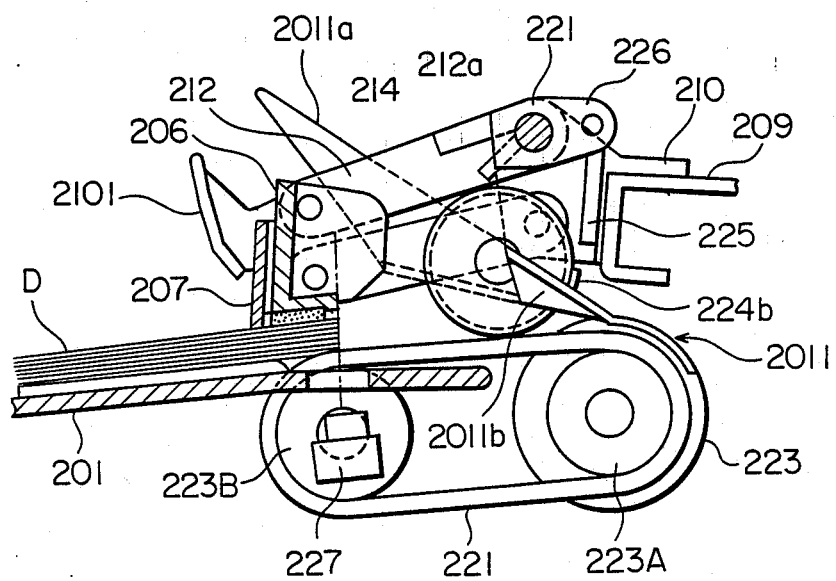

When the inner gate 206 and the outer gate 207 are at their upper positions, if the shaft 211 is turned counterclockwise the drive unit 217 and the gate levers 212 are turned downward together with the push pins 214, the gate member 206 descends as shown in FIG. 5(B). At this moment, the push pins 214 move farther than tee position where the gate members 206 and 207 come into contact with document sheets on the document sheet stacker. As a result, the gate members 206 and 207 compress document sheets 'D' with their own weight. When the gate member 206 moves up and down, it is linked to the auxiliary levers 213, so that the front of the gate always remains vertical to the upper surface of the document sheet stacker 201. In other words, the front of the gate members 206 and 207 meet at almost right angles with the surface of document sheets regardless of the number of document sheets.

The cam gear 216 is equipped with a small plate 219 which intercepts the sensor 218 at its beginning stage. The base position of the sensor 218 is the position when the sensor is intercepted by the above-mentioned small plate. The drive unit is turned normally or in the reverse direction to the angle required according to a signal sent from the sensor. A stepped motor capable of pulse control is preferrable in this case.

The numeral 220 is a push belt which pushes a pile of documents 'D' to the document sheet feed position. The numeral 221 is a document sheet feed belt which carries the bottom sheet of the pile and the numeral 222 is a stop roller which comes into contact with the document sheet feed belt 221 and prevents double feeding. In this way, the document sheet separation means is established in this machine. The document sheet feed belt 221 is set between the drive roller 223A and the idle roller 223B. The drive roller is connected with the main motor 250 through the electric-magnetic clutch 223 and one way control means which is not shown in the drawings. The upper surface of the document sheet belt protrudes a little from the level of the ribs 201a of the document sheet stacker 201.

Figure 7A:
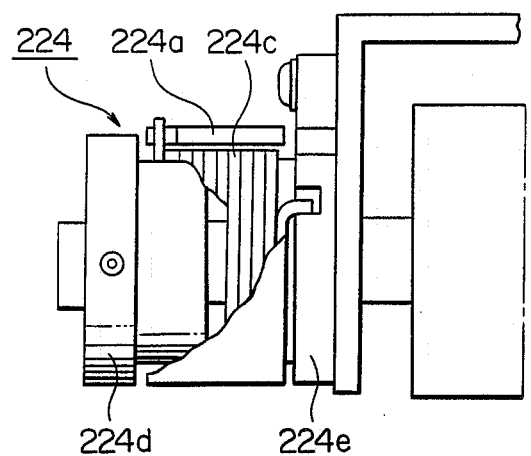
FIG. 7(A) is a partial front view of a spring clutch which is installed in a stop roller shaft.
Figure 7B:
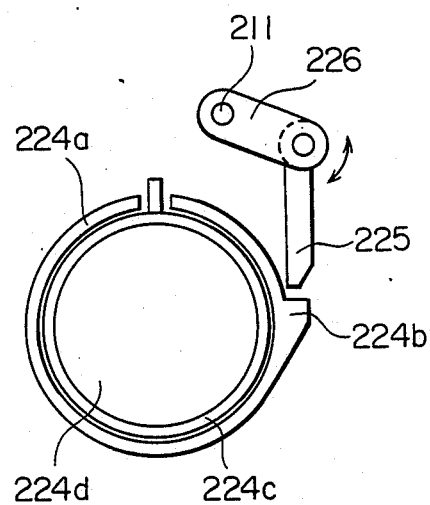
FIG. 7(B) is a sectional side view of the spring clutch.

The spring clutch 224 is installed in the shaft of the stop roller 222. The structure of the spring clutch is explained in detail. FIG. 7(A) and 7(B) show the details of the clutch. The stop roller 222 can be turned freely by pressing the projection 224b of the outer sleeve 224a downward with the clutch lever 225. That causes he spring 224c to be released from the spring bosses 224d and 224e. This results in free rotation of the stop roller 222. When the clutch lever 225 does not press the projection 224b of the outer sleeve 224a, the spring clutch 224 controls the rotation of the stop roller 222. This clutch lever 225 is mounted on the arm 226 which is connected with the shaft 211. Therefore, when the inner gate 206 ascends by the rotation of the shaft 211 through the push pin 214 as shown in FIG. 5(A), the clutch lever 225 descends and presses the projection 224b of the spring clutch 224 clockwise. On the other hand, as shown in FIG. 5(B), when the inner gate member 206 and the outer gate member 207 descend by the reverse rotation of the shaft 211 and mounts on document sheets 'D', the clutch lever 225 rises from the projection 224b of the spring clutch 224. In this way, the projection 224b is released from the clutch lever 225. As a result, the spring clutch 224 returns to the initial position by spring force and controls the rotation of the above-mentioned stop roller 222.

Figure 8:
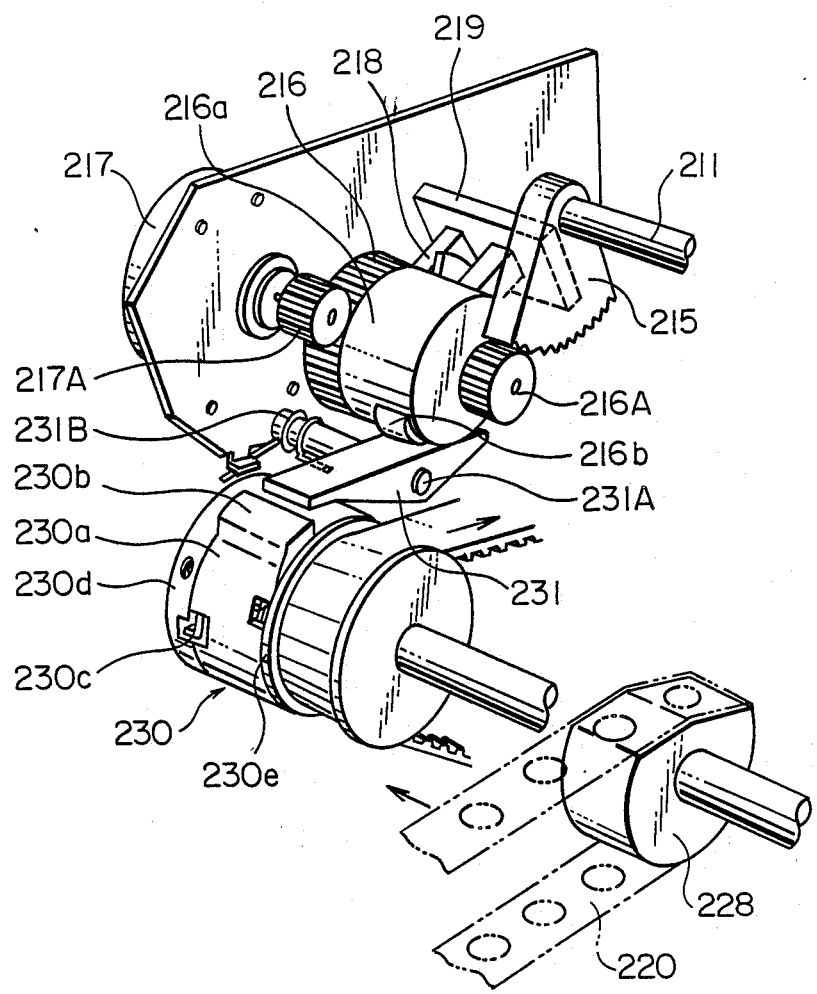
FIG. 8 is a perspective illustration of the crescent shaped roller control mechanism.

The push belt 220 is a perforated belt which is set between two crescent shaped rollers 228 and 229. As shown in FIG. 8, this crescent shaped roller 228 is driven by the main motor 250 through the spring clutch 230 in the same way as the document sheet feed roller 221.

Figure 9A:
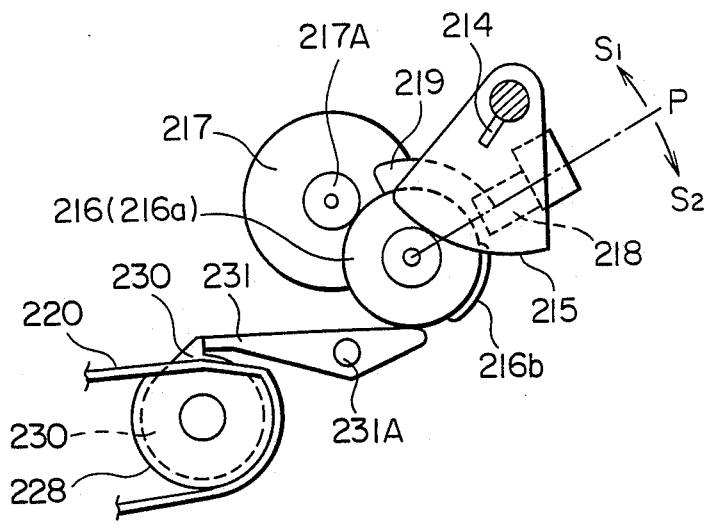
FIG. 9(A) and FIG. 9(B) are illustrations which show the operation of the rotation control mechanism of the crescent shaped roller.
Figure 9B:
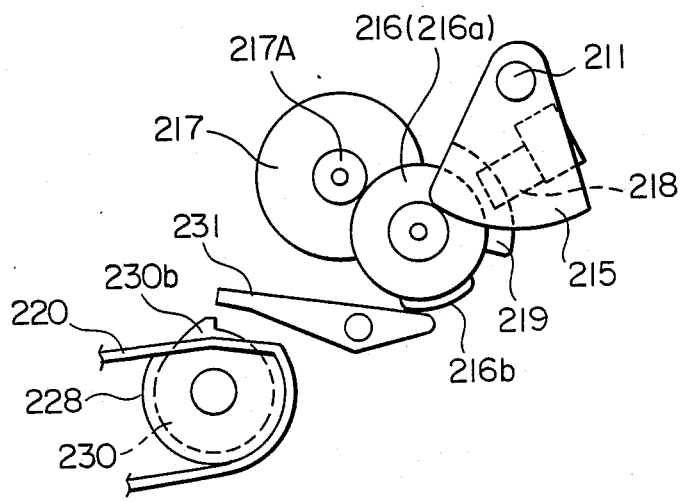

When the projection 230b is checked by the tip of the clutch lever 231 which is mounted at the support point 231 and the rotation of the outer sleeve 230a is restricted as shown in FIG. 9(A), the built-in clutch spring 230c is released from the spring bosses 230d and 230e as shown in FIG. 8 and the driving power from the main motor is cut off by the clutch. When the tip of the clutch lever 231 is disengaged from the projection 230b of the sleeve 230a of spring clutch 230 as shown in FIG.

9(B), the clutch spring 230 compresses the spring bosses 230 and 230a and the drive force of the main motor 250 is transmitted to the crescent roller 228.

The rear end of the clutch lever 231 comes into contact with the cylindrical part of the gate cam gear 216a with the pressure caused the tension spring 231a. A part of this cylindrical portion 216a is equipped with the cam-shaped portion 216b. Therefore, when the gate cam gear 216 is rotated by the power transmitted from the drive unit 217 which drives the gate member 207 and the cam-shaped portion 216b presses the rear part of the clutch lever 231 downward, the tip of the clutch lever 231 is disengaged from the projection 230b of the outer sleeve 230a of the spring clutch 230. This oscillation of the clutch lever 231 is conducted in the range of the rotation of the gate cam gear 216 when the inner gate member 206 descends without any relation with the downward movement of the gate member 206. The gate gear 216 has the home position which is shown as the mark P in FIG. 9(A) and this position is decided by the initial position sensor 218 and the small plate 219. The rotation range S1 which is located in the counterclockwise range of the point P is used for the vertical motion of the gate member 206 and the clockwise range S2 is used for the oscillation of the clutch lever 231. In this connection, in the range S2 where the gate gear 216 rotates, the push pin 214 is disengaged from the gate lever 212 and the sector gear 215 is not engaged with the pinion gear 216A either.

The movement of each part of this device is summarized as follows.

The crescent roller 228 starts rotating by the power of the main motor 250 after the tip of the clutch lever 231 is disengaged from the projection 230b of the sleeve 230a. Then the gate cam gear 216 rotates counterclockwise by the reverse rotation of the drive unit 217 and the rear part of the clutch lever 231 is disengaged from the cam-shaped portion 216b. In this way, the spring clutch is released. The clutch lever 231 is returned to the position close to the outer sleeve 230a of the spring clutch by the spring 231B. Therefore, the projection 230b of the outer sleeve 231a of the spring clutch which rotates together with the crescent roller 228 bumps against the tip of the clutch lever 231 again and separates the drive force transmitted from the main motor 250. Consequently, the crescent roller 228 always rotates one revolution and stops.

As shown in FIG. 2, the push belts 220 are installed in the through holes 232 which are horizontally arranged at three positions in the case of FIG. 3, on the document sheet stacker 201. The peripheral parts of the through holes 232 rise as high as the ribs 201a and the entry side of the through holes 232a has an inclined surface in order to feed document sheets smoothly as shown in FIG. 2.

Figure 6A:
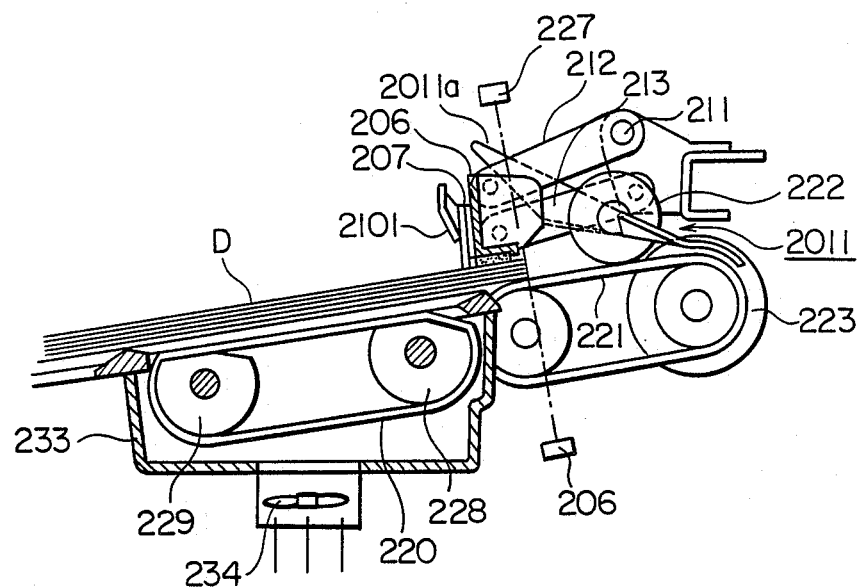
FIG. 6(A) and FIG. 6(B) are illustrations which show the operation of push belts and crescent shaped rollers.
Figure 6B:
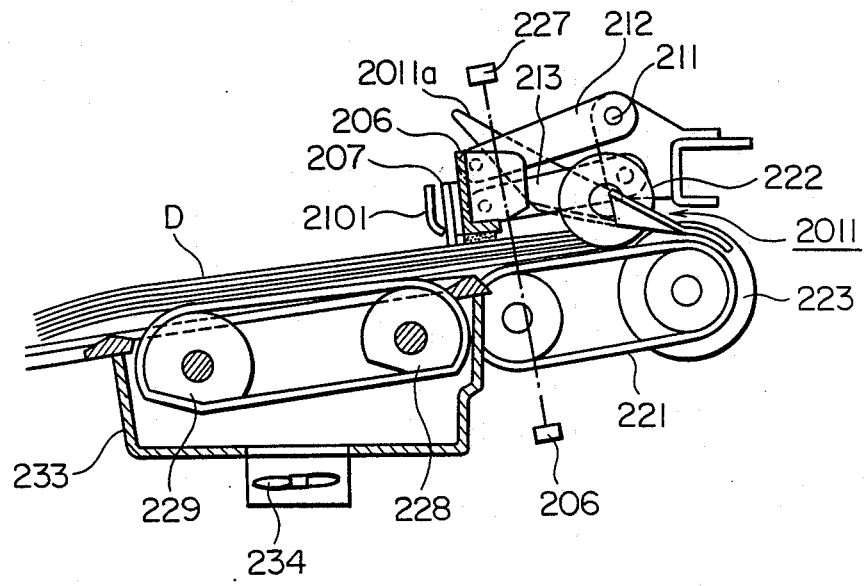

When the cutout part of the crescent rollers 228, 229 comes round to the upper position as shown in FIG. 6(A), the upper surface of the push belt 220 comes under the through holes 232. When the circumferential portion of the crescent rollers 228, 229 comes round to the upper position as shown in FIG. 6(B), the upper surface of the push belt 220 protrudes from the level of the through holes 232. In other words, document sheets 'D' piled on the normal position of the document sheet stacker 201 are lifted up higher than the through holes 232 at each rotation of the crescent rollers 228, 229. A pile of document sheets on the stacker 201 is carried toward the document sheet feed belt 221 by the push belt 220 with the friction between the belt and the document sheet. In this case, the document sheet feed belt 221 is not driven and remains stationary since the drive force from the main motor 250 is cut by the electric clutch 223, so that the leading edge of the document sheet 'D' which is pushed out by the push belt 220 is squeezed into the nip point like a wedge. In this case, the nip point means the point at which the stop roller 222 comes into contact with the document sheet feed belt 221 with pressure in order to separate the bottom document sheet from the pile on the stacker.

The numeral 233 is a suction box which encloses the lower side of the push belt 220. The objective of the suction box 233 is to intensify the suction force caused by the suction fan 234 to suck the bottom document sheet through the gap of the push belt 220 and the belt holes in order to increase document sheet separation efficiency.

In FIG. 1, the numeral 235 represents the document sheet path which guides the document sheet 'D' sent from the document sheet feed device 220 Onto the platen glass 102 in the processing unit of the copy machine. The numeral 237 represents the document sheet reversal path to reverse the document sheet which is fed onto the platen glass 102 after or before exposure. Another purpose of the reversal path 237 is to correct the order of document sheets when they are returned to the stacker after exposure. As shown in FIG. 1, the reversal path 237 begins with the platen glass, loops upward, and joins the above-mentioned path 235.

The numeral 238 is a conveyance roller which is installed on the path 235. It is called the second document sheet feed roller. The numerals 239 and 240 are conveyance rollers which are installed on the above-mentioned reversal path 237. These conveyance rollers 238, 239, 240, are connected with the main motor 250 through one way clutch and always rotate in the same direction.

The numeral 241 represents the conveyance belt which carries the document sheet 'D' on the platen glass 102 in the normal and reverse direction. This conveyance belt 241 is installed between the first roller 242 of the document sheet feed side and the second roller 243 of the document sheet discharge side. The first roller 242 is connected with the main motor 250 through the normal and reverse rotation changeover device. The tension roller 244 comes into contact with the upper surface of the conveyance belt 241 at the first roller side with pressure and a plurality of pressing rollers 245 come into contact with the lower side of the conveyance belt 241. In this way, the conveyance belt 241 keeps slidable contact with the platen glass 102.

The numeral 103 is the document sheet stopping device which is mounted on the document sheet discharge side of the platen glass 102. This stopping device 103 can move above and below the platen glass 102. The numeral 255 is the document sheet discharge guide plate which is connected with the discharge side of the platen glass 102. The numeral 256 represents the document sheet discharge belt. The document sheet discharge belt 256 is installed right behind the document sheet stacker 201. This document sheet discharge belt is set by a group of rollers. Those are the drive roller 257 which is connected with the main motor 250 through the one way clutch, the upper end roller 258 and lower end roller 259 which can move horizontally along the document sheet stacker 201, and the assistant rollers 260, 261 which are mounted at the position close to the document sheet discharge guide plate 255. The document sheet 'D' sent by the conveyance belt 241 is carried by the drive roller 257 in the document sheet discharge direction. The drive roller 257 drives the discharge belt 256 being driven by the drive unit which can rotate both normally and in the reverse direction and the drive force is transmitted by chains. The moving mechanism of the document sheet belt 256 is used as the trailing edge control board 202 against which the trailing edges of document sheets are checked when document sheets are set on the document sheet stacker 201.

The drive unit 272 is controlled by the control means, which is not shown in the drawings, when it rotates both normally and in the reverse direction. When the sensor which is not shown in the drawing detects that the document sheets 'D' are not set on the document sheet stacker 201, the copy button is pressed, and as a result, the control means makes the drive unit 272 rotate normally and makes the trailing edge control board 202 move forward from the home position. When the leading edge of document sheets 'D' is detected by the stack sensor 227 and its signal is sent and received by the control means, it stops the drive unit 272, and as a result the trailing edge control board 202 stops its movement. After that, the drive unit rotates in the reverse direction. By this operation, the trailing edge control board 202 moves backward from the position where it stopped. In this case, it is no problem to move it backward to the home position in one movement. But in this embodiment, document sheets are moved backward as long as the leading edges of document sheets crossed under the inner gate member 206. This operation is effective to minimize the amount of the movement of the trailing edge control board 202 when document sheets are fed again after all the document sheets are circulated once.

The numerals 275, 276 represent the compression rollers which come into contact with the document paper discharge belt 256 corresponding to the assistant rollers 260, 261. The numeral 277 represents the upper guide plate which is hinged to the upper frame of the document feeder 200. The numeral 278 represents the document sheet discharge guide board which is set above the document sheet discharge belt with a little gap between the board and the belt. The numeral 279 represents the compression roller which comes into contact with the document sheet discharge belt 256 from the upper part of the document sheet discharge board 278 through the through holes.

The numeral 282 represents the changeover claw which is installed in the middle of the document sheet guide board 255 and sorts out the document sheet circulation path A through which the document sheets are carried to the document sheet stacker 201 from the document sheet discharge path B through which document sheets are carried to the outside of the machine.

The changeover claw opens the document sheet discharge path B when the trailing edge control board 202 returns to the home position and the changeover claw opens the document sheet circulation path A when the trailing edge control board 202 is not at the home position. This changeover operation can be conducted by a solenoid or another adequate mechanism.

The numeral 284 represents the manual feed board which is hinged to the upper guide plate 277 at its upper tip. The manual feed board is usually folded on the upper surface of the upper guide plate 277 as shown in FIG. 1. When document sheets are fed sheet by sheet according to single document feed mode, the manual feed board can be turned over the document sheet stacker 201 for the function of the hinge. When the manual feed board 284 is turned over, the tip of it reaches the position close to the document sheet feed belt 221.

Figure 11:
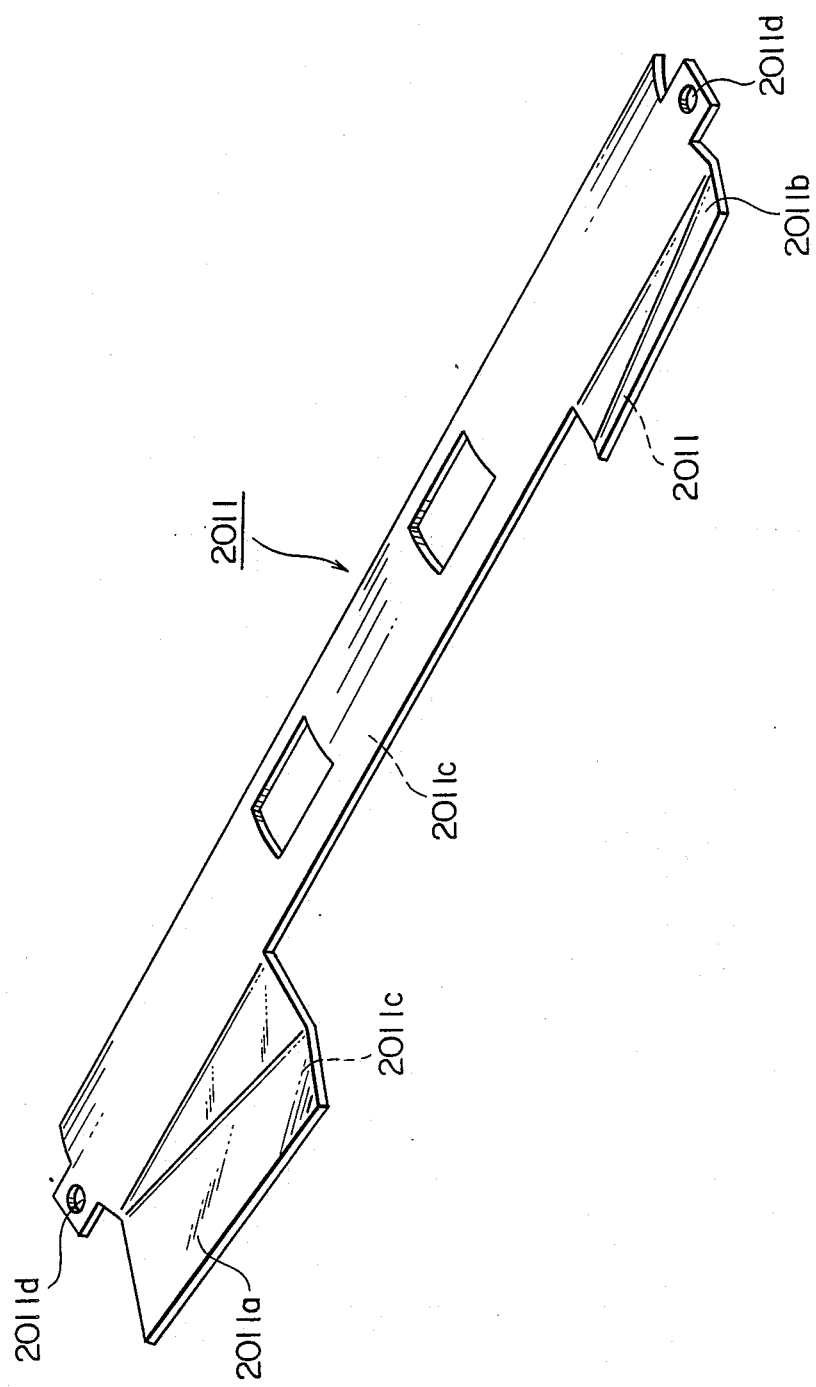
FIG. 11 is a perspective illustration of the document guide.
Figure 12:
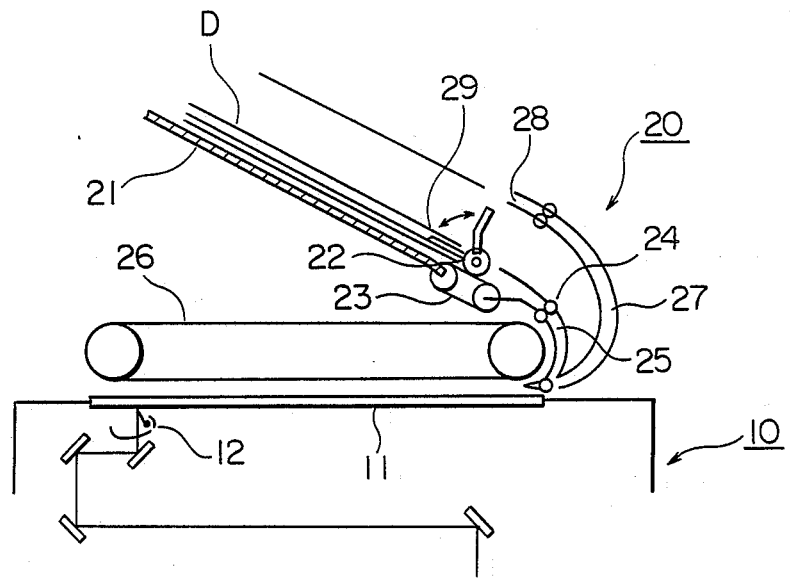
FIG. 12 is a schematic illustration of a conventional document feeder.

FIG. 10 represents the front view of the document sheet guide member of the present invention. FIG. 11 represents the perspective illustration of the document sheet guide member.

The document sheet guide member 2011 is made of a sheet of metal the thickness of which is approximately 0.5 mm. The sheet of metal is punched and bent to form a fixed shape.

This document sheet guide member 2011 has the left side guide part 2011a and the right side guide part 2011b. The middle part of the left side guide part and the right side guide part is cut out to form a U shape in order to make the outer gate member 207 and the inner gate member 206 run off when those members move upward and downward.

The document sheet entry side parts of both the left side guide part 2011a and the right side guide part 2011b are bent upward as shown in FIG. 11. The left side guide part 2011a and the right side guide part 2011b are not symmetrical with regard to the direction of document sheet feeding. In this embodiment, the width of the bent part of the right side guide part 2011b is smaller than that of the left side guide part. This helps to exchange document sheets easily.

The lower side 2011c of the document sheet guide member 2011 is smooth to guide document sheets smoothly.

The document sheet guide member 2011 has holes 2011d to fit the member itself to the wall of the recycling document handling device with screws and the like.

The numeral 2011 is the gate cover for each gate member and the drive mechanism.

The document feeder of the present invention is equipped with the above-mentioned document sheet guide member 2011 and the guide member works effectively to feed document sheets. When a pile of document sheets is fed by the rotation of the push belt 220 and the document sheet feed belt 221, the document sheets 'D' are smoothly guided and fed forward with the help of the left side document sheet guide part 2011a and the right side document sheet guide part 2011b of the wide open document sheet guide member 2011 even if both sides of the document sheets 'D' are curled up. In this way, document sheets reach the nip position where the document sheet feed belt 221 comes into contact with the stop roller 222 with pressure. At this nip position, document sheets are separated sheet by sheet and carried to the processing unit.

The operation of the document feeder in this embodiment is explained as follows.

A pile of document sheets 'D' is set on the stacker 201 with the trailing edge of the document sheets checked by the trailing edge control board 202 which is at the home position. In this case, the document sheet surfaces to be copied are set facing upwards and the document sheets are arranged in order according to the pages. After both sides of the document sheets are controlled by the document sheet side control boards 203, the number of copies is input and the copy button is pressed. Then the drive unit 217 to drive the gate member 206 starts to work and lifts up the gate member 206 to allow a pile of document sheets to go through.

Then the drive unit 272 starts and moves the bottom end roller 259 backward through intermediate gears and sprockets. In accordance with this motion, the trailing part control board 202 advances forward pushing the rear edges of the document sheets 'D' and finally the leading edge of the document sheets 'D' passes through under the outer gate member 207 and the inner gate member 206. When the leading edge of the document sheets 'D' is detected by the stack sensor 227, the drive source 272 stops, directed by the control means, and the gate drive means 217 turns in the reverse direction. As a result, the inner gate member 206 and the outer gate member 207 descend on the pile of document sheets. At this moment, the gate members 206, 207 press the upper surface of the document sheet downward with their own weight regardless of the number of the document sheets. When the crescent rollers 228, 229 are connected with the main motor 250 and the push belt 220 is driven, the document sheets 'D' are pushed toward the nip position where the stop roller 222 comes into contact with the document sheet feed belt 221. At this moment, the bottom document sheet advances toward the nip position as if it were a wedge and then it stops, wherein the nip position is formed by the stop roller 222 and the document sheet feed belt 221.

Then the document sheet feed belt 221 is driven in the direction of feeding document sheets. At this moment, the stop roller 222 which comes into contact with the document sheet feed belt 221 is not rotated, so only the bottom document sheet is carried by the document sheet feed belt 221. The rest of the document sheets are blocked by the stop roller 222 and double feeding is prevented. When the document sheet feed belt 221 runs, the push belt 220 starts to run synchronization with the document sheet feed belt 221. Only the bottom document sheet is sucked by the suction fan 234, and it is separated from the pile of the document sheets and carried in the document sheet feed direction by the document sheet feed belt 221. In this way, the function of the stop roller 222 to prevent double feeding is increased.

As explained before, the trailing edge control board stops its movement at the moment when the leading edges of the document sheets 'D' are detected by the stack sensor 227. and goes back to the position which is fixed according to the size of the document sheet being copied.

In this way, a document sheet sent from the document sheet feed belt 221 goes into the path 235. The document sheet is nipped by the feed rollers 238 installed on the path and carried to the platen glass 102 and feed belt 241 at the synchronized exposure speed. After the leading edge of the document sheet crosses the sensor 285 mounted on the path 235, that is installed right under the feed roller 238, the magnetic clutch 223 is cut off at the right moment decided by the document sheet size. The document sheet carried by the feed rollers 238 is carried on the platen glass by the feed belt 241. While carried onto the platen glass 102 at the synchronized exposure speed, the document sheet is exposed to the light by the optical exposure system 101 and the image is formed on the photoreceptor drum. After exposure, the document sheet is carried along the document sheet discharge board 256 and discharged toward the document sheet stacker 201 by the document sheet discharge belt 256. In this case, with the help of the document sheet delivery opening guide board 278 and the document sheet delivery guide board which consists of the document sheet path, a group of rollers such as the compression roller 279, the assistant rollers 275, 276 hold the document sheet. So even if the document sheet delivery opening moves according to the size of the document sheet, the document sheet 'D' sent from the platen glass 102 by the feed belt 241 is nipped between the feed belt and the document sheet delivery opening and delivered.

The leading edges and the trailing edges of the document sheets 'D' which are delivered onto the document sheet stacker 201 are arranged by the outer gate member 207 and the inner gate member 206. Both sides of the document sheets are arranged by the side control board 203. Therefore, document sheet feed efficiency is increased when those document sheets are copied next time.

The above-mentioned document sheet feed operation is repeated according to the document sheet feed timing and the synchronized conveyance speed which are decided by the copy size and the copy magnification until all the document sheets set under the gate members 206, 207 are carried to be copied. When the stack sensor 227 detects that all the document sheets under the gate members are conveyed and the document sheet delivery sensor 286 detects that the last document sheet is delivered, the gate members 206, 207 are lifted up again and the document sheets on the stack are pushed by the trailing edge control board 202 to the fixed position. This operation is repeated until the required number of copies is attained. After the required number of copies is achieved and the document sheet delivery sensor 286 detects the fact, the trailing edge control board 202 returns to its home position to prepare for the next operation.

The above-mentioned operation explains the case of recycling document handler mode. In other words, it is a one sided copy from a one sided document sheet. Therefore, the document sheet stopping device 103 which is installed at the delivery side of the platen glass 102, is set at the level below the platen glass 102 and the optical exposure system 101 is in the fixed mode. In the case that automatic document feed mode is set in this apparatus, the optical exposure system 101 is set to the movement mode and the document sheet stopping device 103 mounted on the delivery side of the platen glass 102 protrudes from the level of the platen glass 102. The document sheet is bumped against it and stops at that position, the exposure position. The optical exposure system 110 is moved to expose the light. After the required number of copies is achieved, the document sheet stopping device 103 retracts and the feed belt 241 starts to run again. Therefore the document sheet 'D' is carried to the delivery side and delivered to the document sheet discharge tray 283 from the document sheet delivery opening through the change-over claw 282.

In the case that a two sided document is to be copied one sided, the document sheet sent from the document sheet stacker 201 is carried to the platen glass 102 through the path 235. On the platen glass 102, the last page is set facing upward. So a countermeasure must be taken. (1) After the document sheet fed to the platen glass 102 is stopped, (2) the document feed belt 241 is reversed and the document sheet is sent to the reversal path 237, the document sheet is turned over and the last page is set facing downward. Then the document sheet is exposed to the light on the platen glass by the fixed optical exposure system 254. (3) After being exposed to the light, the feed belt 241 is reversed again and the document sheet passes through the reversal path 237 again, so the order of the document sheets is revised and another side of the page is set on the platen glass 102 facing downward, and exposed to the light on the platen glass 102. Then the document sheet is returned to the document sheet stacker 201. A one sided copy from a two sided document is completed by repeating these (1), (2), and (3) operations explained above.

In the case that both sides of a two sided document sheets are to be copied, the document sheets are returned to the document sheet stacker 201 without being exposed to the light in the above-mentioned operation (3). Only even-numbered pages are copied in the first circulation and odd-numbered pages are copied in the second circulation. When odd-numbered pages are copied, reverse operation is not needed as a matter of course. Needless to say, copy paper feed operation of the document copy apparatus 100 is conducted in accordance with the above-mentioned document sheet feed operation.

The principal features of the present invention are explained as follows.

In a document feeder in which document sheets are circulated in a closed loop from a document sheet stacker to processing units, gate members which can ascend, descend and press a pile of document sheets to be copied, are installed in the down stream side of the document sheet stacker being close to the document sheet separation means, and document sheet curl control members which can oscillate in accordance with the movement of the gate members are mounted on both sides of the gate members, furthermore comprising a document sheet guide plate, both sides of which are bent upward and set in the down stream side of the document sheet stacker.

The apparatus of the invention has the features mentioned above, so even if the leading edge of a document sheet is curled up, the curl is pressed slightly by the curl control members and the document sheet guide plate. As a result, document sheets are carried smoothly and the reliability of document sheet feeding is increased. Since a pile of document sheets on the stacker does not need to be pressed strongly as in conventional apparatus, a stain on the surface of a document sheet which is caused by friction of document sheets can be avoided. Deformation of images caused by rubbing, or damage on the surface of a document sheet which stems from compression in a conventional document feeder can be avoided, too.

What is claimed is:

1. A document feeder for use in a copy machine comprising:
    a document sheet stacker adapted to receive a stack of document sheets thereon;
    separation means for separating a sheet from the bottom of the stack of document sheets and feeding the separated sheet to a copying member;
    means for shifting the stack of document sheets from said document sheet stacker to said separation means;
    gate means disposed between said document sheet stacker and said separation means and adapted to be lifted so as to regulate the passage of the stack of document sheets so that when said gate means is lowered, the leading edges of the document sheets in the stack come in contact with said gate means, whereby the leading edges of the documents are aligned, and while said gate means is lifted upwardly, the stack of document sheets passes under said gate means; and
    sheet edge-regulating means attached to said gate means so that when said gate means is lifted upwardly, said sheet edge-regulating means is moved adjacent the upper surface of the stack of document sheets and regulates the leading edge of the stack of document sheets so as to pass under said gate means.

2. The document feeder of claim 1, further including a trailing edge-regulating means for conveying the trailing edge of the stack of document sheets, wherein when said gate means is lifted upwardly, the stack of document sheets is conveyed by said trailing edge regulating means.

3. The document feeder of claim 1, further including a guide plate for guiding the stack of document sheets into said separation means, said guide plate including a first side guide part and a second side guide part extending upwardly along the width of the stack of document sheets.

4. The document feeder of claim 3, wherein the first and second side guide parts are asymmetrical with each other.

5. The document feeder of claim 3, wherein said guide plate is made of one sheet.

* * * * *